July 24, 1951          C. G. DEWEY          2,561,848
OUT-OF-STEP PROTECTIVE SYSTEM
Filed March 9, 1949
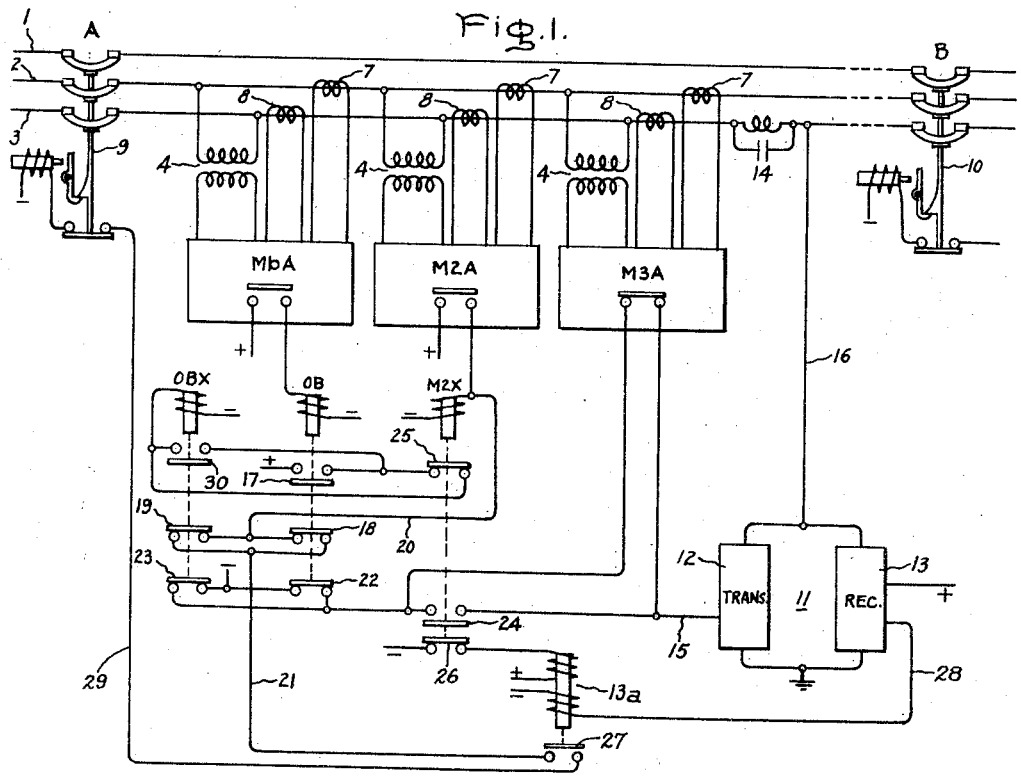
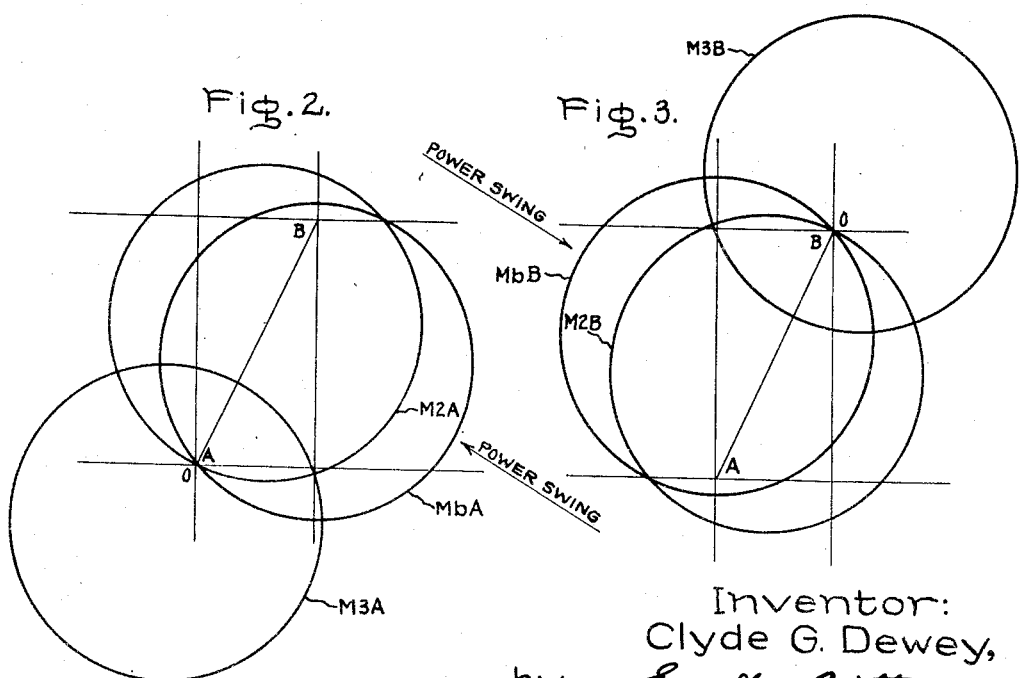
Inventor:
Clyde G. Dewey,
by Ernest C. Britton
His Attorney.

Patented July 24, 1951

2,561,848

UNITED STATES PATENT OFFICE 2,561,848

OUT-OF-STEP PROTECTIVE SYSTEM

Clyde G. Dewey, Philadelphia, Pa., assignor to General Electric Company, a corporation of New York Application March 9, 1949, Serial No. 80,522

10 Claims. (Cl. 175—294)

1

This invention relates to electric protective systems and a principal object of the invention is to provide an improved selective protective relay combination that will prevent an electric power system from being disconnected upon the occurrence of a power swing while providing for disconnecting the system during the first slip cycle upon the occurrence of an out-of-step condition as well as upon the occurrence of predetermined line faults.

In accordance with my invention, a power swing blocking relay and a fault protective relay are provided with overlapping impedance characteristics such that upon the occurrence of a power swing, the blocking relay will pick up first in the sequence before the protective relay and thereby control sequential interlocking circuit elements to prevent operation of the circuit interrupters located at both ends of the line section upon the subsequent pickup of the protective relay. As the power swing becomes progressively more severe, the protective relay may pick up but does not cause disconnection of the system unless the slowly developing power swing develops into an out-of-step condition. Should normal conditions prevail after a power swing occurs such that the system becomes stable following the swing, disconnection of the system will not occur since the reset operation of the protective relay will occur before reset of the blocking relay. Should, however, an out-of-step condition occur, the continued response sequence in which the two relays again operate is such that the blocking relay will reset while the protective relay is picked up so that the interlocking circuit elements are no longer effective to prevent tripping of the circuit interrupters at each end of the protected line section and as a result, the system will be disconnected. Should a fault occur, the protective relay will operate immediately to trip its associated interrupter before sufficient time will have elapsed for the blocking relay and its associated sequential interlocking circuit elements to operate to prevent tripping.

For a better understanding of my invention, reference may be had to the accompanying drawing in which Fig. 1 is a schematic representation of a protective arrangement embodying my invention which arrangement would comprise the protective apparatus and circuit interlocking elements located at one end of a protected line section; Fig. 2 is a resistance-reactance diagram which shows among other things the impedance characteristics of some of the relays shown in Fig. 1; and in which Fig. 3 is a resistance-re-

2 actance diagram showing the impedance characteristic of relays such as those shown in Fig. 1 but which relays would be located at the other end of the protected line section.

Generally speaking, a protective arrangement to which my invention is readily applicable is of the type disclosed in U. S. Patent 2,405,081—Warrington—granted July 30, 1946 and assigned to the assignee of this invention. The arrangement disclosed in this Warrington patent comprises three directional distance relays M1, M2 and M3 which are used for protecting three zones of a transmission line. These relays are of the well-known mho type and have circular impedance characteristics.

For purposes of describing my invention, it is necessary to consider only one zone such, for example, as the second zone protected by the M2 element, it being understood that identical protective apparatus would be located at each end of a protected line section. The two ends of the protected line section shown in Fig. 1 are designated by the letters A and B respectively. The protective arrangement shown in Fig. 1 is located at end A of the protected line section which at the right-hand end is shown dotted to represent greater length of line than is indicated.

With reference to Fig. 2, the line AB represents the impedance of the transmission line AB shown in Fig. 1. The circle M2A is the impedance characteristic of the protective relay M2A shown in Fig. 1. Under normal system conditions, the system impedance would lie outside of the circle M2A as is well understood. Should a fault occur in the line, the relay M2A would pick up and operate its contact to trip its associated circuit breaker. In this respect, the unit M2A is the equivalent of the mho unit M2 for example, which is described in the above Warrington patent. In Fig. 2, the circle MbA is the characteristic circle of the mho unit MbA shown in Fig. 1. The circular impedance characteristic M3A that overlaps the circular impedance characteristic of the protective relay M2A shown in Fig. 2 is the characteristic circle for the mho unit M3A shown in Fig. 1. This latter unit corresponds to the third zone mho unit such as M3 for example, as described in the above Warrington patent. The unit M3A is not essential to my invention but is shown in the drawing for the sake of completeness.

Should a power swing develop, as indicated in Fig. 2, and approach the characteristic circles of the various units, the power swing impedance would enter the circle MbA before entering the circle M2A. Thus, the blocking unit MbA is caused to pick up before protective unit M2A and as will be explained in connection with the sequential circuit interlocking elements of Fig. 1, the protective relay is prevented from tripping the circuit breaker as the power swing, which develops relatively slowly, becomes progressively more severe. Should the power swing diminish in severity, the impedance of the system would move out of the impedance circles of units M2A and MbA and the system would not lose synchronism. The protective relay M2A will reset before blocking relay unit MbA resets and hence no disconnection of the system will occur. If, however, the power swing should become more and more severe and eventually intersect the impedance line AB and pass on to the left, the system would be out-of-step. When the system impedance leaves the circle MbA, the unit would again reset first in the continued response sequence and the blocking action of the sequential circuit interlocking elements controlled by this unit would not longer be effective so that protective relay M2A would then be picked up and thereby effective to disconnect the system. Thus the pickup and reset sequence in which these relays operate during the first slip cycle is utilized to effect disconnection of the system.

The impedance diagram of Fig. 3 is unlike the diagram of Fig. 2 in that in Fig. 3 the characteristic circles for the units located at the end B of the protected line section are shown. The unit MbB is the blocking unit and the relay M2B is the protective relay. From Fig. 3, it is clear that these relays afford protection against undesirable tripping on a power swing entering the impedance characteristic of the relays from the left and moving generally toward the right while the relays at the end A of the line, as shown in Fig. 2, afford protection against undesirable tripping on a power swing entering from the right and moving generally toward the left.

The arrangement disclosed in Fig. 1 is shown applied to conductors 2 and 3. It will be understood that a similar arrangement would be used in connection with conductors 1 and 2 as well as with conductors 1 and 3. The units MbA, M2A, and M3A are all of similar construction and are energized by potential between conductors 2 and 3 by means of potential transformers 4. The relays are responsive to the current in conductors 2 and 3 and are connected thereto through current transformers 7 and 8.

The system shown in Fig. 1 is operable to control the trip circuit of circuit interrupter 9. It will be understood that the circuit interrupter 10 located at end B of the polyphase line would be controlled by an arrangement identical to that shown in Fig. 1.

The carrier apparatus generally designated by the numeral 11 comprises a transmitter 12 and a receiver 13, the details of which are well known. An auxiliary receiver relay 13a is provided to operate in conjunction with receiver 13. The energization of either the upper or lower coil of this relay; or of both coils, opens its contacts 27 and the deenergization of both coils of this relay closes these contacts. To facilitate the flow of high frequency carrier current between the carrier system 11 and a corresponding carrier apparatus at end B of the line, a suitable line trap 14 of known construction may be used. The carrier transmitter 12 is controlled by negative bias connected thereto through the conductor 15. As is well known, if a suitable negative bias is supplied to the transmitter 12, the transmitter is held off. If the bias is removed the transmitter causes a high frequency carrier signal to be transmitted to the receiver 13 and to a similar carrier receiver located at the station B by way of the conductor 16 and the line 3. So long as a carrier signal is transmitted to the receivers at each end of the line section, current will flow in conductor 28 from the positive conductor through the circuit in receiver 13, through conductor 28 and to the lower coil of receiver relay 13a, holding open its contacts 27 so that the tripping of either interrupter 9 or interrupter 10 is effectively prevented. If, however, negative bias is supplied to the conductor 15, the transmitter 12 is incapable of transmitting a carrier signal. If contact 26 of relay M2X is open, the contacts of receiver relay 13a will remain closed unless a carrier signal is received from the transmitter location at station B.

As will be obvious from Fig. 1, the sequential interlocking elements are arranged and interconnected in such a manner that the auxiliary relay OB is operated from one position to another position upon pickup of the blocking relay MbA and the auxiliary relay OBX is operated by the auxiliary relay OB in case the protective relay M2A is not picked up. The auxiliary relay M2X is operated from one position to another position upon pickup of the protective relay M2A. The receiver relay 13a is controlled by normally closed contacts 26 of relay M2X and also by a circuit inside of receiver 13.

When a power swing develops on the protected line section AB and passes through the characteristic impedance circle of the relay MbA, this relay picks up and closes its contacts and operates the auxiliary interlocking relay OB. Operation of relay OB causes operation of the sequential interlocking relay OBX due to the movement of the bridging contact 17 of relay OB to the closed position in case contact 25 also is closed. Once the sequential interlocking relay OBX is picked up it will remain so even if relay M2X is operated sequentially while relay OB remains energized, since a circuit to the coil of relay OBX will be complete through the contacts 17 and 30. Operation of sequential interlocking relays OB and OBX causes their respective bridging contacts 18 and 19 to move to the open position and thereby to open the connection between conductors 20 and 21 which comprise a portion of the tripping circuit for interrupter 9. Also the sequential operation of relays OB and OBX moves their respective bridging contacts 22 and 23 to the open position which movement disconnects the conductor 15 from its source of negative bias. In this way, the transmitter 12 is caused to generate a carrier signal which energizes the lower coil of receiver relay 13a, as previously described, as well as the coil of the receiver relay located at end B of the protected line section. Thus, after the power swing enters the characteristic circle of relay MbA, tripping of the interrupter cannot be accomplished due to the operation of the sequential interlocking elements. Of course, if the power swing reverses direction and moves out of the circle MbA, stability of the system will have been restored and operation of the circuit interrupter will not occur upon the reverse sequential operation of the interlocking elements.

If the power swing becomes progressively more severe and enters the characteristic circle of protective relay M2A this relay will pick up and close its contacts and energize conductor 20. This will not cause tripping, however, because the bridging contacts 18 and 19 of the sequential interlocking elements have already been opened. Opening of contact 26 will not cause the contact 27 of relay 13a to close since the lower coil of relay 13a is energized by carrier operation as already explained. Closing of bridging contact 24 of interlocking relay M2X does not supply negative biasing potential to transmitter 12 since bridging contacts 22 and 23 have already been opened. Opening of bridging contact 25 of relay M2X does not affect the sequential interlocking relays OB and OBX once these relays are operated by relay MbA. Should the power swing reverse direction soon after entering the circle of M2A tripping will not occur since protective relay M2A always will reset before the blocking relay MbA resets.

Should the power swing intercept the system's impedance line AB, shown in Fig. 2, the system will fall out of step. It would then be desirable to disconnect the system. When the power swing moves further to the left in Fig. 2 and out of the impedance circle of relay MbA, this relay will open its contacts first in the continued sequence and as a result auxiliary relay OB will be deenergized. When bridging contact 18 is thus closed, the tripping circuit is complete from the source of positive potential through the contacts of relay M2A, conductor 20, bridging contact 18 and conductor 21 and through the contacts of the receiver relay 13a which will be closed. The contacts of relay 13a will be closed because closing of bridging contact 22 applies negative potential to the transmitter 12 to cause the transmitter to cease generation of a blocking signal so that the lower coil of relay 13a is deenergized. Because contact 26 is open the upper coil of relay 13a is deenergized. The circuit to conductor 29 and the trip coil of interrupter 9 will thus be completed when the blocking relay MbA resets while the protective relay M2A is picked up and the interrupter 9 will move to the open position.

From the above detailed description, it will be understood that the blocking relay MbA will pick up first and is effective to prevent a tripping operation from being initiated by protective relay M2A during a power swing because auxiliary sequential interlocking relays OB and OBX have sufficient time to operate before the protective relay M2A picks up due to the relatively slow progress of the power swing as the swing moves across the characteristic circle of blocking relay MbA and before the swing moves into the circle of protective relay M2A.

Should a fault condition occur on the protected line section AB, the system impedance will move almost instantaneously from some point outside the characteristic circles of relays MbA and M2A to a point somewhere within the impedance circles of these relays. Thus, these two relays operate substantially simultaneously during a fault and relays OB and M2X also operate substantially in unison. Operation of relay OB would, as already explained in connection with a power swing condition, open contact 22 but this would not remove the negative bias from transmitter 12 because the contact 23 of relay OBX would not have operated because relay OBX would not have sufficient time in which to operate before contact 25 of relay M2X is opened. Thus, the transmitter 12 would remain biased off and a blocking signal would not be generated. Thus the lower coil of relay 13a would not be energized and the upper coil of this relay would not be energized since contact 26 of relay M2X is open, so that the contacts of receiver relay 13a would be closed. Opening of bridging contact 18 would not prevent the flow of current from positive potential through the contacts of relay M2A, conductors 20 and 21, the contacts of receiver relay 13a, conductor 29, and the trip coil of circuit interrupter 9, because the bridging contact 19 of relay OBX would remain closed. Thus, when a fault occurs, tripping is not prevented because of the unavailable time required for the sequential interlocking relay OBX to operate after relays OB and M2X have operated substantially simultaneously. Of course, if conditions were such that relay M3A is not caused to operate, the bridging contact 24 does not perform a useful function since the contacts of relay M3A are in parallel with contact 24.

Because the relays located at station B have overlapping impedance characteristics such as are shown in Fig. 3, and because the relays at either station A or station B are operative to control the carrier apparatus, blocking signals will be transmitted whether the power swing comes into the characteristic circles of the relays from the left as shown in Fig. 3 or from the right as shown in Fig. 2 and hence complete protection against undesired tripping during power swings is provided. A fault on protected line section AB would operate the relays at each end of the line section and would cause isolation of the line section AB.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States, is:

1. A sequential relay combination for protecting an electric power system comprising a protective relay of the impedance type provided with a predetermined impedance characteristic to control the pickup and reset thereof in response to varying conditions of the system, a blocking relay of the impedance type provided with a predetermined over-lapping impedance characteristic such that said blocking relay picks up before said protective relay picks up in response to a power swing on the system and resets while the protective relay is picked up during the first slip cycle when the power swing results in an out-of-step condition, and switching means operable under control of said relays and having circuit connections established thereby dependent upon a predetermined sequence of pickup and reset of said relays for causing disconnection of the system upon reset of said blocking relay while the protective relay is picked up.

2. A sequential relay combination for protecting an electric power system comprising a protective relay for controlling the disconnection of the system and provided with a predetermined impedance characteristic for controlling the pickup and reset thereof, a blocking relay provided with a predetermined overlapping impedance characteristic such that said blocking relay picks up before said protective relay picks up in response to a power swing on the system and resets after the protective relay resets when the power swing does not result in an out-of-step condition but resets while the protective relay is picked up during the first slip cycle when the power swing results in an out-of-step condition, and sequential interlocking switching means operable under control of said relays upon the sequential pickup thereof and having circuit connections for preventing disconnection of the system whenever the blocking relay is picked up before the protective relay is picked up and having other circuit connections for causing disconnection of the system in response to reset of said blocking relay while the protective relay is picked up.

3. A sequential relay combination for protecting an electric power system comprising a protective relay provided with a predetermined impedance characteristic for controlling the pickup and reset thereof in response to power swings on the system, a blocking relay provided with an overlapping impedance characteristic such that said blocking relay is picked up before said impedance relay during a power swing within the stability limits of the system which effects reset of said protective relay before reset of said blocking relay when normal conditions are restored and effects reset of said blocking relay while the impedance relay is picked up during the first slip cycle when the power swing results in an out-of-step condition, and means including a plurality of auxiliary interlocking relays operable under control of said protective and blocking relays upon sequential pickup thereof for preventing disconnection of the system and having circuit connections established thereby upon reset of the blocking relay while the protective relay is picked up for effecting disconnection of the system and having one of said auxiliary relays jointly controlled by said protective and blocking relays upon substantial simultaneous pick up thereof in response to predetermined fault conditions on the system for causing disconnection of the system.

4. A sequential relay combination for protecting an electric power system comprising a protective relay provided with a predetermined impedance characteristic for controlling the pickup thereof to initiate the disconnection of the system and reset thereof, a blocking relay provided with an overlapping impedance characteristic such that the blocking relay is picked up substantially simultaneously with the protective relay in response to predetermined fault conditions of the system and is picked up before the protective relay is picked up during a predetermined power swing which effects reset of the protective relay while the blocking relay is picked up when the power swing does not result in an out-of-step condition but effects reset of the blocking relay while the protective relay is picked up during the first slip cycle when the power swing results in an out-of-step condition, and selective switching means controlled by the relays and having circuit connections established thereby dependent upon the pickup and reset sequence of said relays for causing disconnection of the system both in response to reset of said blocking relay while the protective relay is picked up and in response to substantially simultaneous pickup of the relays.

5. A sequential relay combination for protecting an electric power system comprising a protective relay provided with a contact and a predetermined impedance characteristic for controlling the pickup thereof to initiate the disconnection of the system and reset thereof, a blocking relay provided with a contact and an overlapping impedance characteristic such that said relays are picked up substantially simultaneously in response to predetermined fault conditions of the system but are picked up in a predetermined blocking sequence during a power swing which does not result in an out-of-step condition and which produces reset operation of the blocking relay while the protective relay is picked up during the first slip cycle when the power swing results in an out-of-step condition, and electrically operated interlocking switching devices having energizing circuits under control of the contacts of the relays and having control circuit connections established thereby in response to pickup operation of said relays in said predetermined blocking sequence for rendering the protective relay contact ineffective to initiate disconnection of the system and having other control circuit connections established thereby for rendering the protective relay contact effective to initiate disconnection of the system both upon said reset operation of said blocking relay while the protective relay is picked up and upon substantially simultaneous pickup of the relays.

6. A sequential relay combination for protecting an electric power system comprising a protective relay of the impedance type having a contact for controlling the disconnection of the system and provided with a predetermined impedance characteristic for controlling the pickup of the contact to initiate disconnection and reset thereof, a blocking relay of the impedance type provided with an overlapping impedance characteristic such that said blocking relay is picked up before said protective relay upon a power swing on the system and such that said blocking relay is reset before said protective relay is reset during the first slip cycle when a predetermined out-of-step condition of the system results, and means including an auxiliary relay operable to one position to render the protective relay contact ineffective upon the pickup of said blocking relay and to another position upon the reset of said blocking relay and having circuit connections controlled thereby in said other position for cooperating with the contact of said protective relay upon pickup thereof to cause disconnection of the system.

7. A sequential relay combination for protecting an electric power system comprising a protective relay provided with a predetermined impedance characteristic for controlling the pickup thereof and having control switching means operated thereby for initiating disconnection of the system under fault conditions, a blocking relay provided with an overlapping impedance characteristic such that said blocking relay is picked up substantially simultaneously with the protective relay in response to predetermined fault conditions of the system and is picked up before said protective relay is picked up upon a power swing in the system and such that said protective relay is reset before said blocking relay resets when the power swing does not result in an out-of-step condition but which effects reset operation of said blocking relay while said protective relay is picked up during the first slip cycle when the power swing results in an out-of-step condition, blocking switching means controlled by the blocking relay and having circuit connections for rendering said control switching means ineffective upon pickup of the blocking relay before pickup of the protective relay and effective upon reset of the blocking relay while the protective relay is picked up, and a third switching means jointly controlled by the relays for rendering said blocking switching means ineffective upon said substantially simultaneous pickup of said relays.

8. A selective relay combination for controlling the trip circuit of an interrupter associated with an electric power system comprising a protective relay having switching means operable when the relay is picked up for closing the trip circuit and provided with a predetermined impedance characteristic for controlling the pickup and reset of the relay, a blocking relay provided with a predetermined overlapping impedance characteristic such that said blocking relay picks up before said protective relay in response to a power swing and such that said blocking relay resets before said protective relay during the first slip cycle when the power swing results in an out-of-step condition, a first auxiliary relay connected for operation from one position to another position in response to pickup operation of said blocking relay and a second auxiliary relay connected for operation from one position to another position upon operation of said first auxiliary relay to said other position when the protective relay is not picked up, said first and second auxiliary relays having circuit connections separately controlled thereby and effective in said other positions of both thereof for preventing closure of the interrupter trip circuit when the protective relay is picked up and effective in the one position of the first auxiliary relay upon reset operation of said blocking relay while the protective relay is picked up and in the one position of the second auxiliary relay upon simultaneous pickup of the relay for closing the trip circuit of the interrupter.

9. A selective relay combination for controlling the trip circuit of an interrupter associated with an electric power system comprising a protective relay energized from the system and having a contact for closing the trip circuit only when the relay is picked up and provided with a predetermined impedance characteristic for controlling the pickup and reset of the relay, a blocking relay energized from the system and having a predetermined overlapping impedance characteristic such that said blocking relay picks up before said protective relay picks up in response to a power swing and such that said blocking relay resets before said protective relay resets during the first slip cycle when the power swing results in a predetermined out-of-step condition, a first auxiliary relay operable from one position to another position in response to pickup operation of said blocking relay, a second auxiliary relay operable from one position to another position in response to operation of said first auxiliary relay to said other position when the protective relay is not picked up, said first and second auxiliary relays having circuit connections controlled thereby when both are operated to said other positions for preventing closure of the interrupter trip circuit upon pickup operation of said protective relay and effective for closing said trip circuit when each auxiliary relay is operated to the one position upon reset of said blocking relay during the out-of-step condition and a third auxiliary relay operable from one position to another position in response to pickup operation of said protective relay for preventing operation of said second auxiliary relay to said other position during a predetermined fault condition causing substantially simultaneous pickup of said blocking and protecting relays, thereby to close the trip circuit of the interrupter.

10. A sequential protective relay combination for controlling circuit interrupting means associated with each end of a protected line section having normally inoperable blocking carrier means connected to the line at each end of the protected section and having switching means controlled thereby for preventing tripping of the interrupting means at each end of the protected line section comprising a separately responsive protective relay at each end of the line section and having a predetermined impedance characteristic, a separately responsive blocking relay at each end of the line section and having a predetermined impedance characteristic such that said separately responsive blocking relay at one end of the line section is picked up before the protective relay during a predetermined power swing which does not result in a loss of synchronism and the blocking relay is reset while the protective relay is picked up during the first slip cycle when an out-of-step condition results from the power swing, and separately operable relay means at each end of the line section having sequential interlocking control elements operable in response to the sequential pickup and reset of the associated blocking and protective relays for causing operation of said carrier means to prevent operation of the interrupters at each end of the protected line section when the blocking relay picks up before the protective pickup relay, and for tripping the associated interrupter upon reset of the blocking relay while the associated protective relay is picked up.

CLYDE G. DEWEY.

REFERENCES CITED

The following references are of record in the file of this patent:

UNITED STATES PATENTS

| Number | Name | Date |
| --- | --- | --- |
| 2,386,209 | Goldsborough | Oct. 9, 1945 |
| 2,405,081 | Warrington | July 30, 1946 |
| 2,405,082 | Warrington | July 30, 1946 |
| 2,509,025 | Warrington | May 23, 1950 |

FOREIGN PATENTS

| Number | Country | Date |
| --- | --- | --- |
| 527,343 | Great Britain | Oct. 7, 1940 |